(12) United States Patent
Flodstrom et al.

(10) Patent No.: US 11,002,317 B2
(45) Date of Patent: May 11, 2021

(54) SYSTEM WITH A ROLLING BEARING

(71) Applicant: Aktiebolaget SKF, Gothenburg (SE)

(72) Inventors: Anna Isabella Flodstrom, Gothenburg (SE); Niclas Thim, Olofstorp (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/701,985

(22) Filed: Dec. 3, 2019

(65) Prior Publication Data
US 2020/0191204 A1  Jun. 18, 2020

(30) Foreign Application Priority Data

Dec. 17, 2018 (DE) .......................... 102018221928.1

(51) Int. Cl.
*F16C 41/04* (2006.01)
*F16C 33/78* (2006.01)
*F16C 23/08* (2006.01)

(52) U.S. Cl.
CPC .......... *F16C 41/04* (2013.01); *F16C 33/7886* (2013.01); *F16C 23/08* (2013.01)

(58) Field of Classification Search
CPC ........ F16C 41/04; F16C 23/08; F16C 23/082; F16C 23/086; F16C 33/78; F16C 33/7803; F16C 33/7806; F16C 33/7836; F16C 33/7886; B65D 85/02; B65D 85/58
See application file for complete search history.

(56) References Cited

U.S. PATENT DOCUMENTS

| | | | | |
|---|---|---|---|---|
| 3,080,964 A | * | 3/1963 | Robinson | B65D 85/58 206/303 |
| 5,695,290 A | * | 12/1997 | Mondak | F16C 23/086 384/485 |
| 5,755,323 A | * | 5/1998 | Zahn | B65D 75/24 206/303 |
| 2007/0023303 A1 | * | 2/2007 | Templeton | B65D 43/162 206/318 |
| 2008/0139420 A1 | * | 6/2008 | Takiuchi | F16C 33/6637 508/100 |
| 2012/0269474 A1 | * | 10/2012 | Seuberling | F16C 23/08 384/560 |
| 2019/0331165 A1 | * | 10/2019 | Seko | F16C 35/06 |

FOREIGN PATENT DOCUMENTS

| | | | | |
|---|---|---|---|---|
| EP | 2990674 A1 | | 3/2016 | |
| JP | 2006090357 A | * | 4/2006 | .............. F16C 41/04 |
| JP | WO-2014054149 A1 | * | 4/2014 | |

OTHER PUBLICATIONS

Machine Translation of JP-2006090357-A (Year: 2006).*
Machine Translation of WO-2014054149-A1 (Year: 2014).*

* cited by examiner

*Primary Examiner* — Alan B Waits
(74) *Attorney, Agent, or Firm* — Garcia-Zamor Intellectual Property Law; Ruy Garcia-Zamor; Bryan Peckjian

(57) ABSTRACT

A system having a rolling bearing providing at least an outer ring, at least an inner ring and at least a seal, which seals an inner space of the rolling bearing on a first axial end of the rolling bearing against ingress of liquids and dust. The system further provides a transportation safety device, which is attached to the rolling bearing and restricts swiveling of the inner ring relative to the outer ring in comparison to a state of the rolling bearing in which the transportation safety device is detached from the rolling bearing.

20 Claims, 2 Drawing Sheets

SYSTEM WITH A ROLLING BEARING

CROSS-REFERENCE TO RELATED APPLICATIONS

This application claims priority to German patent application no. 102018221928.1 filed on Dec. 17, 2018, the contents of which are fully incorporated herein by reference.

FIELD OF THE INVENTION

The present invention relates to a system with a rolling bearing including at least an outer ring, at least an inner ring and at least a seal, which seals an inner space of the rolling bearing on a first axial end of the rolling bearing against ingress of liquids and dust. The present invention further relates to a system consisting of the above disclosed rolling bearing, which provides a transportation safety device that is attached to the rolling bearing and which restricts swiveling of the inner ring relative to the outer ring.

BACKGROUND OF THE INVENTION

According to the invention an increased robustness can be achieved. The robustness can be increased in particular in situations in which the rolling bearing is transported or it drops from a certain height to the ground or in procedures in which the rolling bearing is mounted to a shaft or a housing, so that it is prevented that a sealing of the rolling bearing, which can be e. g. of the nature of the embodiment of FIG. 1 in the patent application EP 2 990 674 A1, moves permanently away from its regular position into a position where its functionality has a serious flaw. In particular in the case of the sealing of the abovementioned patent application it can be prevented that the sealing is permanently moved out of the groove in the outer ring in which it is regularly fixed. In particular sealing defects can be avoided and costs for replacing rolling bearings with sealing defects can be saved.

SUMMARY OF THE INVENTION

The object of the invention is to provide a system with an increased robustness. This object is solved by providing a system having a rolling bearing comprising; at least an outer ring, at least an inner ring and at least a sealing, which seals an inner space of the rolling bearing on a first axial end of the rolling bearing against ingress of liquids and dust. a transportation safety device, which is attached to the rolling bearing and which restricts swiveling of the inner ring relative to the outer ring in comparison to a state of the rolling bearing in which the transportation safety device is detached from the rolling bearing.

BRIEF DESCRIPTION OF THE DRAWINGS

Further advantages result from the following drawing description. The drawing shows an example of the invention. The drawing, the description and the claims contain numerous features in combination. The person skilled in the art will also consider the features individually and summarize them to meaningful further combinations.

DETAILED DESCRIPTION OF THE INVENTION

Figure 1:
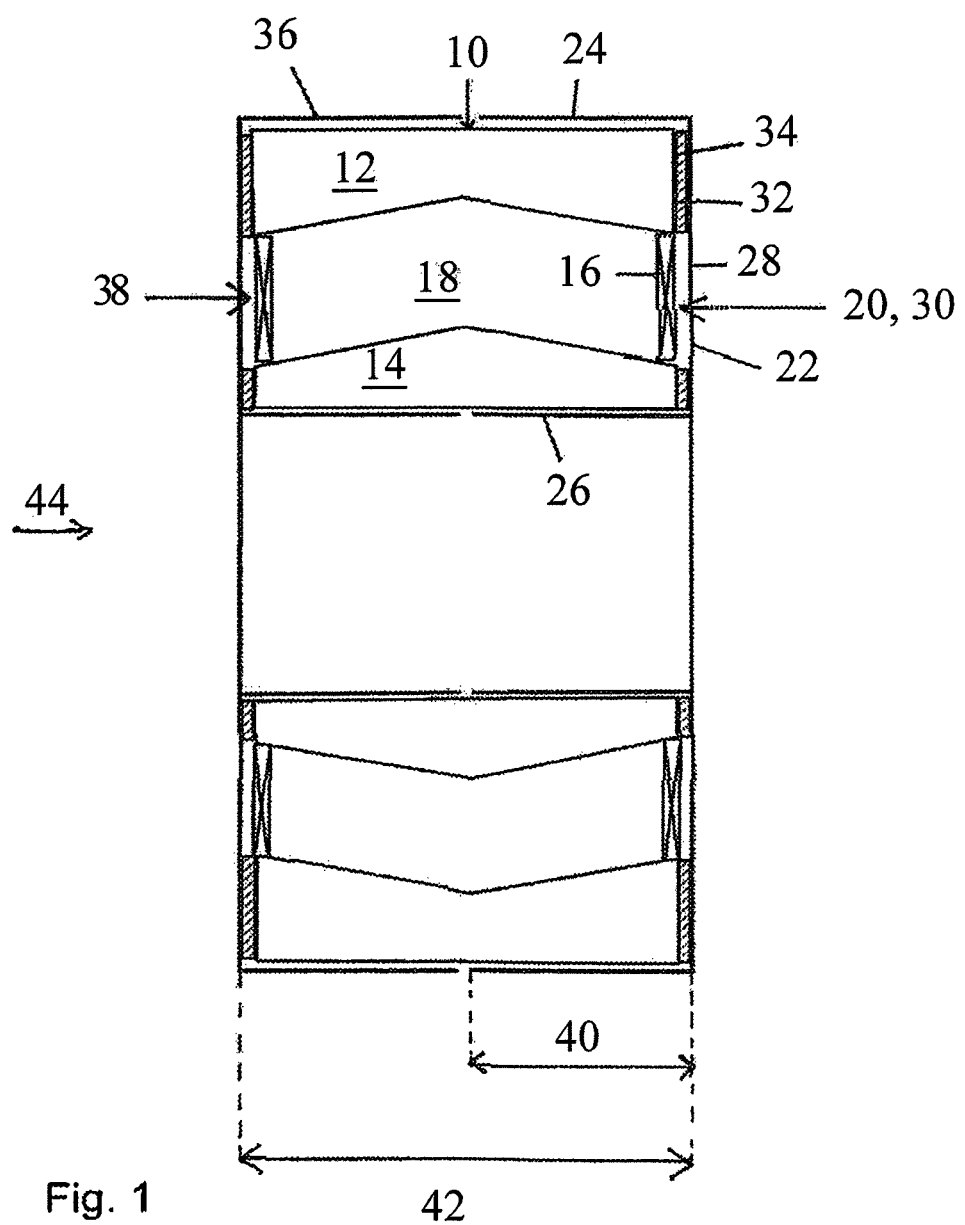
FIG. 1 shows a schematic axial section through a system according to the invention, wherein the cutting plane contains the center of gravity of the rolling bearing of the system.

FIG. 1 shows a schematic axial section through a system according to the invention which comprises a rolling bearing. The rolling bearing is a self-aligning roller bearing and comprises an outer ring 12, and an inner ring 14 and two rows of rolling elements (not shown) which touch the inner ring and the outer ring. Furthermore, the rolling bearing comprises a sealing 16 which seals an inner space 18 of the rolling bearing at a first axial end 20 of the rolling bearing against ingress of liquids and dust. The system comprises a transportation safety device 22 which is attached to the rolling bearing and which restricts swiveling of the inner ring relative to the outer ring in comparison to a state of the rolling bearing in which the transportation safety device is detached from the rolling bearing.

Figure 2:
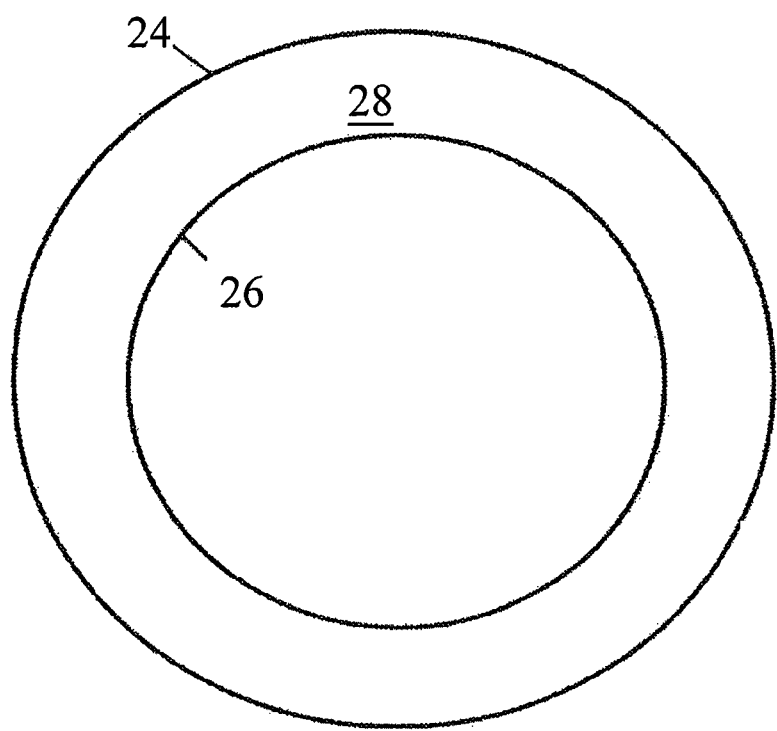
FIG. 2 shows a schematic axial view of the transportation safety device of the system.

The restriction of the axially outward movability of the inner ring relative to the outer ring is performed by a cover region 28 of the transport safety device which covers a complete end surface 30 of the rolling bearing located at the axial end 20. The cover region has the shape of a base of a hollow circular cylinder (FIGS. 1 and 2). A part 34 of the surface is built by the outer ring. The system comprises a liquid 32 between the cover region and the part 34 which causes the transportation safety device to stick to the outer ring. The liquid is oil. During transportation of the system or while the system drops to the ground from a certain height it occurs that a force is applied to the inner ring which tries to swivel the inner ring relative to the outer ring and which therefore tries to accelerate a part of the inner ring vectorially with a component of the vectoral acceleration directed in the axial direction 44. This force is transferred from the inner ring to the transportation safety device and because the transportation safety device sticks to the outer ring the attempt of the force to move the inner ring relative to the outer ring is futile if the force is not too big. Consequentially the sealing 16 is not moved away permanently from its regular position. If for example the height from which the rolling bearing drops is not more than 70 cm the force created by the drop is not too big. Other kinds of damages can happen to the rolling bearing if the drop height is extensive, so this should be avoided. Forces which are created by misalignment of a cage of the rolling bearing, the inner ring and the rolling elements during transport are also not too big.

The width of the transportation safety device is a little bit less than half the width of the rolling bearing. Furthermore, the transportation safety device is made from plastic and comprises a region 24 which is located radially outwardly of the outer ring. Moreover, the transportation safety device comprises a region 26 which is located radially inwardly relative to the inner ring. The transportation safety device consists of the region 24, the region 26 and the cover region 28. The region 26 and the region 24 both have essentially a shape of a hollow circular cylinder.

The system comprises a further transportation safety device 36 which is attached to the second axial end 38 of the rolling bearing. The constructions of the transportation safety devices are identical. In a different embodiment of the invention the further transportation safety device 36 can be omitted.

Because the transportation safety device is made from plastic it can be produced for a low price.

In an alternative embodiment of the invention the transportation safety device has cut-outs especially in the cover region 28. These cut-outs can also be an aid for disassembling from the outer ring.

The invention claimed is:

1. A system with a rolling bearing having first and second axial ends, the system comprising:
   an outer ring having a radially outer surface,
   an inner ring having a radially inner surface,
   a transportation safety device comprising:
      a first cover region configured to envelop the first axial end of the rolling bearing, the first cover region having a first outer region which is adjacent to and axially overlaps a first portion of the radially outer surface of the outer ring, the first cover region having a first inner region located adjacent to a first portion of the radially inner surface such that the radially inner surface axially overlaps the first inner region,
   at least one seal, which seals an inner space of the rolling bearing on a first axial end of the rolling bearing against ingress of liquids and dust, wherein
   the transportation safety device, which is attached to the rolling bearing and which restricts swiveling of the inner ring relative to the outer ring in comparison to a state of the rolling bearing in which the transportation safety device is detached from the rolling bearing,
   wherein the first cover region is axially spaced from the at least one seal, and
   wherein the first outer region and the first inner region are parallel to an axis of rotation of the rolling bearing.

2. The system according to claim 1, wherein the first outer region has a shape of hollow cylinder.

3. The system according to claim 1, wherein the first cover region covers a portion of the first axial end of the rolling bearing.

4. The system according to claim 1, wherein the system further comprises a second transportation safety device that is attached to the second axial end of the rolling bearing, the second transportation device comprising:
   a second cover region configured to envelop the second axial end of the rolling bearing, the second cover region having a second outer region which is adjacent to and axially overlaps a second portion of the radially outer surface of the outer ring, the second cover region having a second inner region located adjacent to a second portion of the radially inner surface such that the radially inner surface axially overlaps the first inner region.

5. The system according to claim 1, wherein the width of the transportation safety device is half of the width of the rolling bearing.

6. The system according to claim 1, wherein the transportation safety device is made from plastic.

7. The system according to claim 1, wherein the rolling bearing is a self-aligning roller bearing.

8. A system with a rolling bearing having first and second axial ends, the system comprising:
   an outer ring having a radially outer surface,
   an inner ring having a radially inner surface,
   a transportation safety device configured to secure a position of the outer ring relative to the inner ring, the transportation safety device comprising:
      a first cover region configured to envelop the first axial end of the rolling bearing, the first cover region having a first outer region which is adjacent to and axially overlaps a first portion of the radially outer surface of the outer ring, the first cover region having a first inner region located adjacent to a first portion of the radially inner surface such that the radially inner surface axially overlaps the first inner region,
   at least one seal, which seals an inner space of the rolling bearing on a first axial end of the rolling bearing against ingress of liquids and dust,
   wherein the transportation safety device, which is attached to the rolling bearing and which restricts swiveling of the inner ring relative to the outer ring in comparison to a state of the rolling bearing in which the transportation safety device is detached from the rolling bearing, and
   a liquid disposed between the transportation safety device and a portion of the first axial end of the rolling bearing that is formed by the outer ring such that the transportation safety device tends to deter movement relative to the outer ring.

9. The system according to claim 8, wherein the liquid is oil.

10. The system according to claim 8, wherein the width of the transportation safety device is half of the width of the rolling bearing.

11. The system according to claim 8, wherein the transportation safety device is made from plastic.

12. A system with a rolling bearing having first and second axial ends, the system comprising:
    an outer ring having a radially outer surface,
    an inner ring having a radially inner surface,
    a first transportation safety device configured to secure a position of the outer ring relative to the inner ring, the transportation safety device comprising:
       a first cover region configured to envelop the first axial end of the rolling bearing, the first cover region having a first outer region which is adjacent to and axially overlaps a first portion of the radially outer surface of the outer ring, the first cover region having a first inner region located adjacent to a first portion of the radially inner surface such that the radially inner surface axially overlaps the first inner region,
    a second transportation safety device configured to secure a position of the outer ring relative to the inner ring, the transportation safety device comprising:
       a second cover region configured to envelop the second axial end of the rolling bearing, the second cover region having a second outer region which is adjacent to and axially overlaps a second portion of the radially outer surface of the outer ring, the second cover region having a second inner region located adjacent to a second portion of the radially inner surface such that the radially inner surface axially overlaps the first inner region,
    at least one seal, which seals an inner space of the rolling bearing on a first axial end of the rolling bearing against ingress of liquids and dust,
       wherein the first transportation device and the second transportation device are axially spaced apart when positioned on separate ones of the first and second axial ends of the rolling bearing.

13. The system according to claim 12, wherein the first outer the first outer region has a shape of a hollow cylinder.

14. The system according to claim 12, wherein the first transportation safety device, which is attached to the rolling bearing and which reduces swiveling of the inner ring relative to the outer ring in comparison to a state of the rolling bearing in which the first transportation safety device is detached from the rolling bearing.

15. The system according to claim 12, further comprising a liquid disposed between the first transportation safety device and a portion of the first axial end of the rolling bearing that is formed by the outer ring such that the transportation safety device tends to deter movement relative to the outer ring.

16. The system according to claim 15, further comprising the liquid also being disposed between the second transportation safety device and a portion of the second axial end of the rolling bearing that is formed by the outer ring such that the second transportation safety device tends to deter movement relative to the outer ring.

17. The system according to claim 16, wherein the liquid is oil.

18. The system according to claim 12, wherein a width of the first transportation safety device is half of the width of the rolling bearing and a width of the second transportation safety device is half the width of the rolling bearing.

19. The system according to claim 12, wherein the first transportation safety device and the second transportation device are made from plastic.

20. The system according to claim 12, wherein the rolling bearing is a self-aligning roller bearing.

* * * * *